United States Patent [19]
Head et al.

[11] Patent Number: 5,211,374
[45] Date of Patent: May 18, 1993

[54] POST PULLER

[76] Inventors: Harold W. Head, 213 E. 3rd St., Cameron, Tex. 76520; Douglas W. Landua, 1300 Leacrest, College Station, Tex. 77840; James A. McAdams, 1200 E. 31st St., Bryan, Tex. 77802

[21] Appl. No.: 767,628

[22] Filed: Sep. 30, 1991

[51] Int. Cl.$^5$ .............................................. E21B 19/00
[52] U.S. Cl. .................................. 254/30; 254/29 R; 254/132
[58] Field of Search ...................... 254/131, 131.5, 132, 254/133 R, 29 R, 30; 269/296

[56] References Cited
U.S. PATENT DOCUMENTS

| | | | |
|---|---|---|---|
| 3,057,599 | 6/1962 | Clatterbuck | 254/132 |
| 4,706,935 | 11/1987 | Thompson | 254/29 |
| 4,846,445 | 7/1989 | Pfeffer | 254/30 |

Primary Examiner—Bruce M. Kisliuk
Assistant Examiner—Eileen P. Morgan
Attorney, Agent, or Firm—Elizabeth G. Gammon

[57] ABSTRACT

Disclosed is an apparatus for removing fence posts and related posts from the ground or other media. The invention is designed to be used primarily with tractors and any other mechanical devices fitted with a three-point hitch and capable of lifting the three-point hitch and attachments. The machine includes two gripper blades arranged in V-shaped pattern and pivotally attached to a substantially pyramidical structure. When the post is gripped by the gripper blades, lifting of the base frame causes the gripper blades to pivot downward into the post. Further use of lifting force from the tractor or other related machine lifts the post out of the ground. After the post is removed from the ground, the post can be placed on the ground by lowering the apparatus which allows the post to drop at no greater angle than the arc created by the V-shaped opening formed by the gripper blades and the housing. This opening prevents the post from rotating in the direction of the operator and striking the operator on the back of the head. Further, this means for placing the posts in a given arc permits the operator to continue removing posts in a straight line without having to drive around scattered fallen posts. This device is entirely mechanical in nature and requires few moving parts and adjustments.

10 Claims, 6 Drawing Sheets

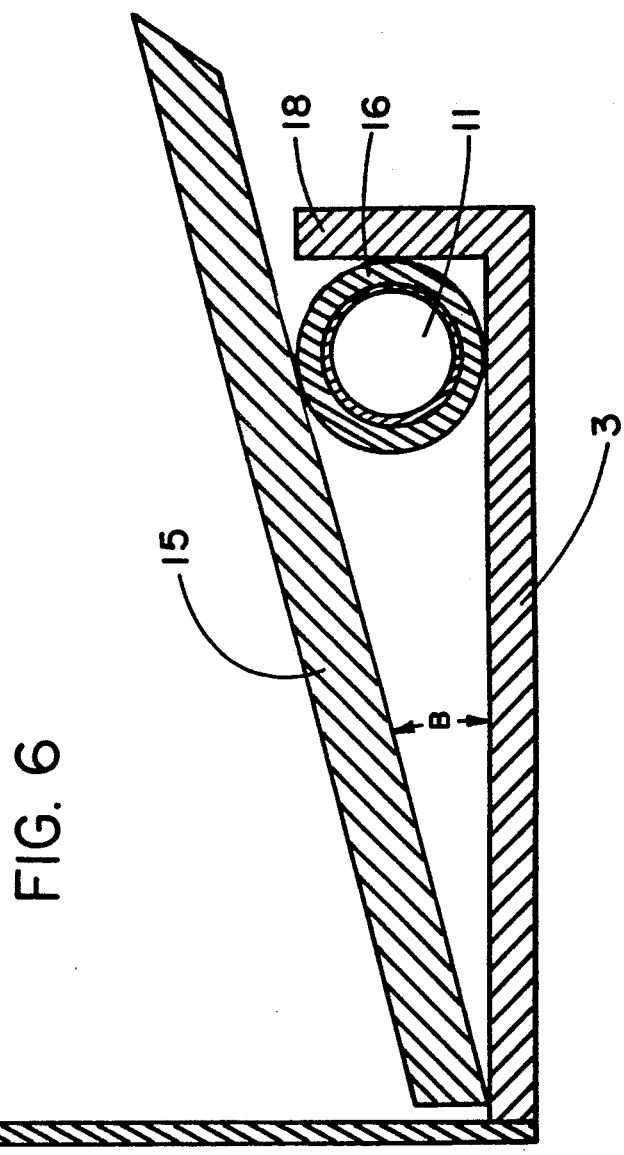

POST PULLER

BACKGROUND OF THE INVENTION

Various devices have been previously disclosed for pulling fence posts from the ground using a farm tractor or other mobile equipment to provide the power for lifting. Some of these are large and complex machines, not suitable for use with smaller tractors commonly found on farms or ranches. Some devices require that the operator dismount from the tractor to attach the gripping means to the post or have a second person present to perform this operation. Some devices require auxiliary power equipment to supply hydraulic or other mechanical power to apply gripping or lifting action, making these devices too complicated and expensive for use by most farm and ranch operators. All or most of these devices require precise maneuvering of the tractor by the operator to approach the post so that it is exactly centered with the pulling device. Additionally, some devices require that the operator lower the tractor's three point hitch at a precise time as the tractor approaches the post in order that the device properly grip the post. Most of the disclosed devices allow the pulled post to fall at random when released so that the operator cannot continue backing the tractor to the next post to be pulled without driving over or around the post which has been pulled and released. None of the disclosed devices will allow the operator to alternately pull various sizes of wooden posts and standard steel T posts without making mechanical adjustments to the device. The capability of pulling a mixture of wood posts and steel posts is of great importance within the farm and ranch community because most fences contain a mixture of these posts.

SUMMARY OF THE INVENTION

The object of the invention is to provide a post puller which is readily attachable to and operated by a three point hitch which is normally found on a farm tractor which will allow the operator of the tractor to alternately pull a wide range of wood fence posts and steel T posts without dismounting from the tractor to attach the gripping means or to readjust the device before pulling various sizes or types of posts. Additionally, the object of this invention is to provide a post puller which will automatically move laterally into a centered position on the post, allowing the operator an easily attained margin of error when maneuvering the tractor into position to pull the post. Although it should be understood that this invention will pull virtually any elongated object with a wide range of sizes and cross sectional shapes from any medium in which they are embedded, it will be described and illustrated here with respect to its pulling a fence post from the ground.

One embodiment of the invention is comprised of a housing fabricated from steel or other suitable material, permanently joined as by welding, with means for attaching to a three point hitch or other lifting mechanism as normally found on a farm tractor and two replaceable gripper blades which are pivotally attached to the base of the housing and which are held in position by two removable pins, the pins being placed at an axis of rotation within a fabricated sleeve and pin hinge. These gripper blades grip and hold the post during the pulling operation. The gripper blades may be switchable and reversible, wherein the left gripper blade may be installed into a right gripper blade position and vice versa, thereby exposing a different portion of each gripper blade to the size of post most frequently pulled, thus extending the usable life of the gripper blades between sharpenings. A variety of gripper blade gripping edge finishes provides greater versatility and efficiency in specific user applications.

The housing contains a base which is comprised of a right base element and left base element which are joined to form a V-shaped opening. The V-shaped opening opens to the rear of the housing. The edges of the V are reinforced with an angle iron section or by a bend turned upwards, which not only provides additional strength, but also acts as a stop to limit the downward travel of the gripping edge of each gripper blade as it rotates about its axis. The gripper blades are attached to the base of the housing by a fabricated sleeve and pin hinge in such a manner that the gripping edge of the gripper blades are effectively parallel to the edges of the V-shape, but extend beyond these edges into the opening even when the gripper blades are in their open or static position. Alternate sections of the sleeve and pin hinge are attached as by welding to the upper surface of the housing's base and to the lower surface of the gripper blade such that these sections can be aligned into a straight line so that the removable hinge pin can be inserted through all hinge sleeve sections, thereby firmly attaching the gripper blades to the housing's base while providing an axis around which the gripper blade can rotate to grip or release the post. The centerline of the hinge which is the center of the axis of rotation of each gripper blade is located such that it is effectively parallel to the forward or sharpened edge of the gripper blade and so that there is less weight contained in the portion of each gripper blade between the center of rotation and the sharpened edge of the gripper blade than there is between the center of rotation and the rearward or un-sharpened edge of the gripper blade. This weight imbalance causes the gripper blade to automatically, due to gravitational effect, assume a position wherein the sharpened edge of each gripper blade is higher than the rear or unsharpened edge when in the static position, and to return to this position each time a pulled post is released.

When the operator of the tractor backs the post puller against a post to be pulled, precise maneuvering of the tractor to ensure perfect alignment with the center of the post is not required. So long as the post is anywhere within the wide opening of the V-shape, the gripping edge of the gripper blade will force the puller to move laterally, centering on the post when the gripping edge of both gripper blades are in contact with the post. Contact of both gripper blades with the post establishes an initial grip on the post. Raising the three point hitch while both gripper blades are in contact with the post forces, or attempts to force, the gripping edges of the gripper blades downward, causing the gripper blades to rotate, or attempt to rotate, about their axis, thereby tightening their grip on the post as rotation of the gripper blades about their axis causes the gripping edges of the gripper blades to come closer together.

BRIEF DESCRIPTION OF THE DRAWINGS

FIG. 6 shows a close-up end of one gripper blade installed in its relation to the floor section.

Figure 1:
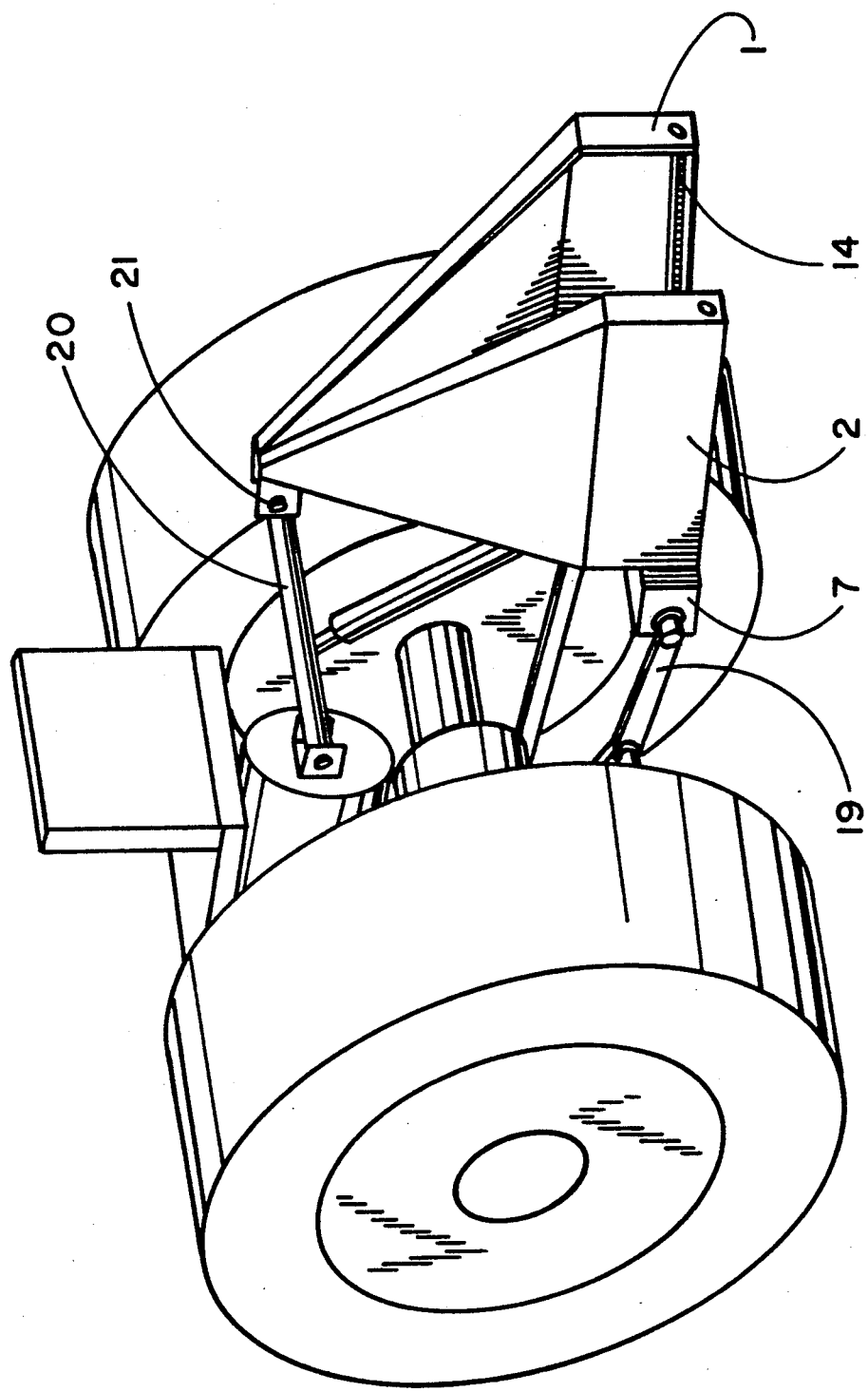
FIG. 1 shows the invention attached to the 3 point hitch mechanism of a farm tractor.

DETAILED DESCRIPTION OF THE INVENTION:

FIG. 1 shows this invention attached to a farm tractor's 3 point hitch mechanism. Neither the two-ton nor its 3 point hitch mechanism are a part of this invention and are shown to depict application only.

Figure 2:
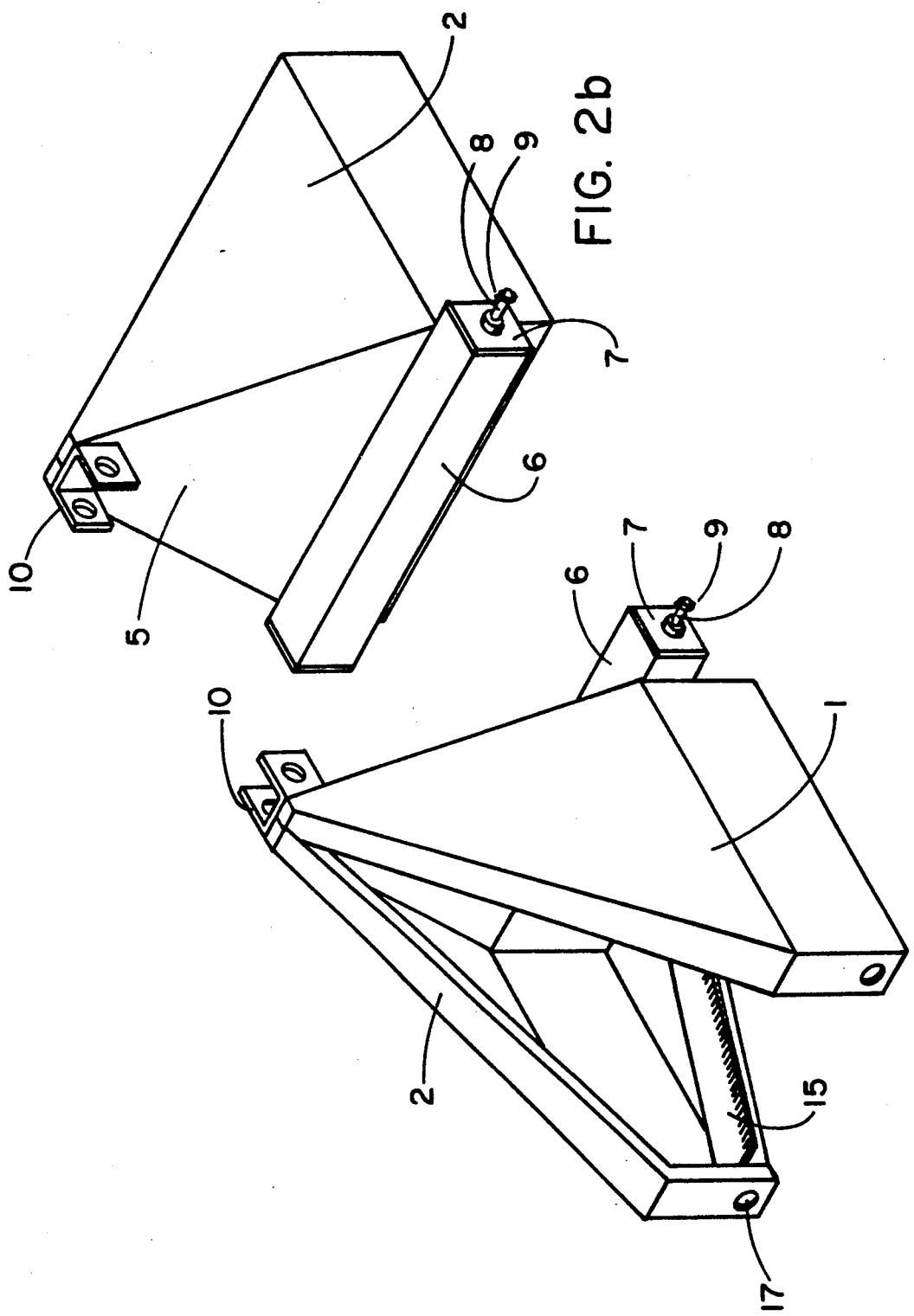
FIGS. 2(*a*) and 2(*b*) show two views of the fully assembled invention.
Figure 3:
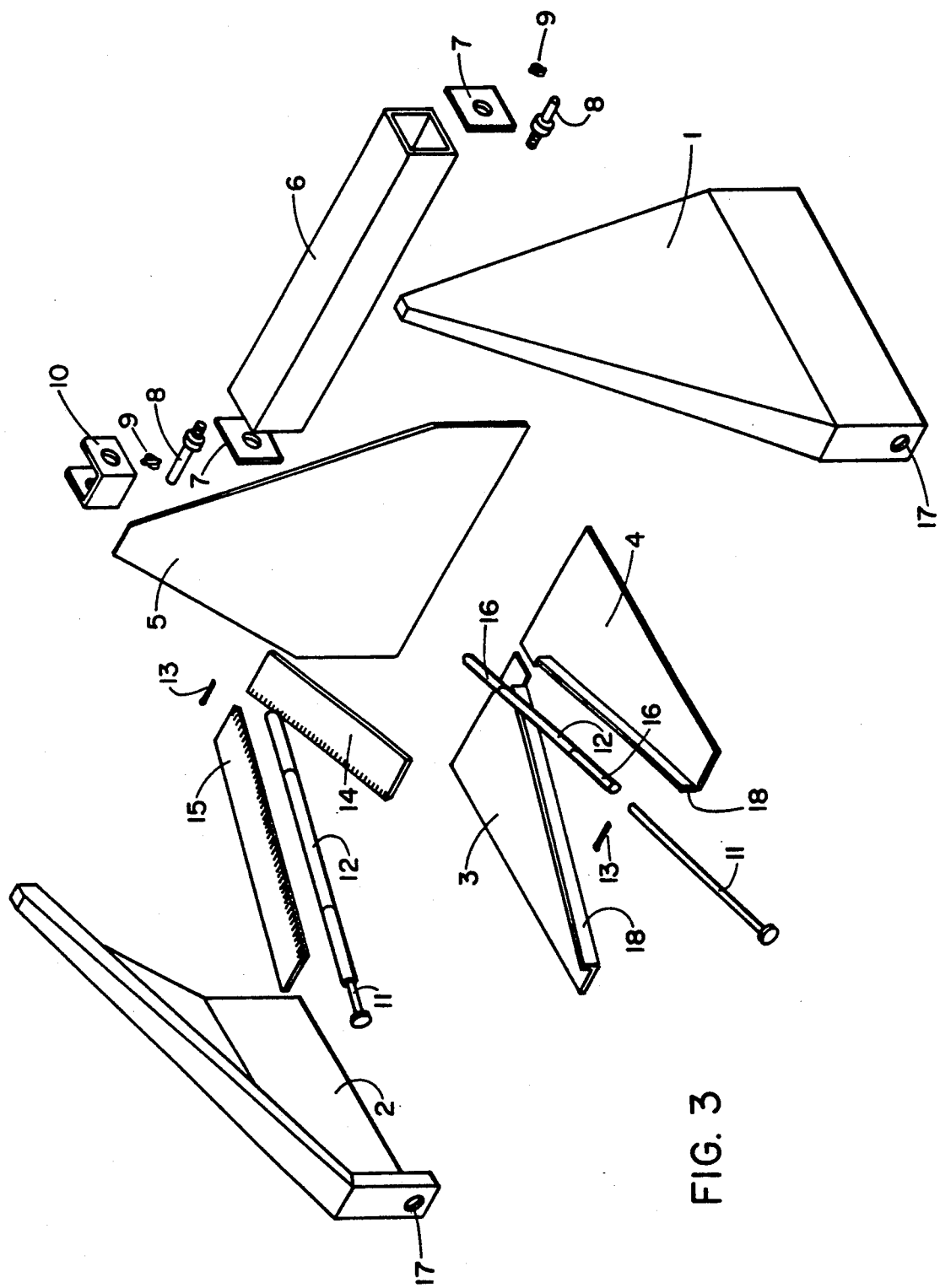
FIG. 3 shows an exploded view of the invention in its preferred configuration.

Referring now to FIGS. 2 and 3, this invention is composed of a housing which is composed of right and left side panels 1 and 2, a front panel 5 and left and right floor sections 3 and 4, all of which are permanently connected as by welding to form a somewhat pyramidical shape. End caps 7 are permanently connected to crosstube 6 which is permanently attached as by welding to the outside of front panel 5 substantially parallel to the bottom edge of the front panel 5. Holes in the end caps 7 receive axles 8 which are inserted through the holes and attached as by welding to the end caps 7 and extend outwardly beyond the end caps 7 effectively parallel to and in line with the centerline of crosstube 6. Bracket 10 is permanently attached as by welding to the upper outside portion of front panel 5 such that the parallel sides of bracket 10 extend outwardly from the outside surface of front panel 5 and substantially perpendicular to it and to the bottom edge of front panel 5. Axles 8 and bracket 10 provide a means for attaching this invention to a standard 3 point hitch mechanism as normally found on a farm tractor.

Referring now to FIGS. 2 and 3, side panels 1 and 2 are made from sheared and formed plate steel. The rearward edges of side panels 1 and 2 contain a double bend which acts to provide both inches at its narrow end which is at the front end of the housing and open to 8 to 16 inches at the wide end which is at the rear of the housing. Referring now to FIG. 3 which shows two lips 18 which are turned upward from floor sections 3 and 4. These lips 18 act to provide additional strength to floor sections 3 and 4 and to provide stops to limit the downward travel of the gripper blades 14 and 15 as they rotate about their axis which is on hinge pin 11.

Figure 5A:
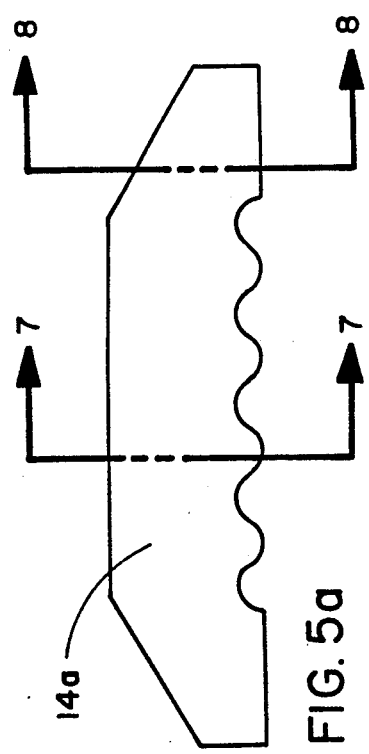
FIG. 5(a) shows a combination wavy and straight edge gripper blade.
Figure 5B:
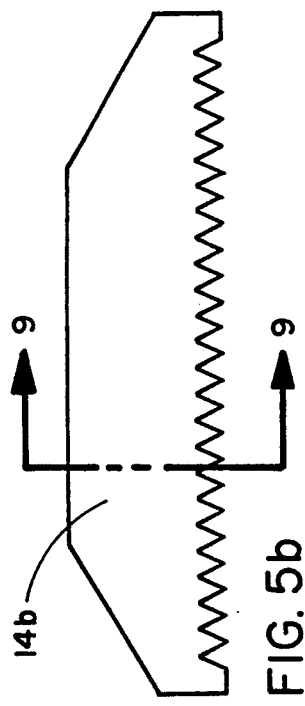
FIG. 5(b) shows gripper teeth edge gripper blade.
Figure 5C:
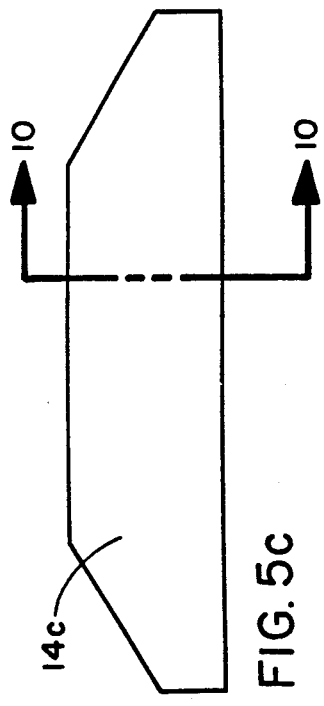
FIG. 5(c) shows straight edge gripper blade.

Referring now to FIG. 3 gripper blades 14 and 15 are connected to floor sections 3 and 4 using a fabricated sleeve and pin hinge to provide for rotation of the gripper blades during the post pulling operation. Hinge sleeve outer sections 16 are permanently attached as by welding to the upper surface of floor sections 3 and 4 effectively parallel to turned up lips 18. Hinge sleeve inner section 12 is permanently attached as by welding to the lower surface of gripper blades 14 and 15 effectively parallel to their sharpened or gripping edge in such a location that less weight is located between the sleeve section and the sharpened edge of the gripper blade than is located between the sleeve section and the un-sharpened edges of the gripper blade. Referring now to FIG. 6, this weight imbalance causes the gripper blades to automatically assume a desirable position wherein the un-sharpened edge of the gripper blade 14 and 15 rests against the floor sections 3 and 4 and the sharpened or gripping edges of the gripper blades are substantially higher than the un-sharpened edge. As indicated, the angle B formed by the floor sections 3 and 4 and the un-sharpened edge of gripper blade 14 and 15 is substantially less than 45 degrees, being generally 15 to 30 degrees. The sharpened edge of the gripper blade is sharpened due to bevel-cutting such that the angle formed between the upper surface of the gripper blade and its bevel-cut surface is substantially less than 90 degrees, being generally 45 to 60 degrees on that portion of the gripper blade intended to grip and hold wood posts. Referring now to FIG. 5(a), three to 6 inches of each end of utility gripper blades is intended to grip and hold metal T posts. Referring now to FIG. 5(a), view B—B, these end portions are additionally bevel-cut so as to form an included angle C of 75 to 115 degrees, being generally about 90 degrees. The end portions of gripper blades are further heat treated to acquire greater hardness, which is required to properly grip and hold metal T posts. The blade referred to in FIG. 5(c) is cut and treated in the same manner as the portion of the blade illustrated in FIG. 5(a), view B—B and is designed to pull steel posts of various sizes. FIG. 5(b) is designed to pull only wood posts of various sizes and provides more positive gripping action than utility blade shown on FIG. 5(a).

Referring now to FIG. 3 the left gripper blade 15 is installed and held in position by inserting it into the housing in such a manner that the inner hinge sleeve section 12 which is attached as by welding to its underneath side rests against the left floor section 3 and is between and in alignment with outer hinge sleeve sections 16 which are attached as by welding to the upper surface of the left floor section 3. After alignment is achieved, hinge pin 11 is inserted through the access hole 17 and through all hinge sleeve sections. Hinge pin keeper 13 is then installed through a hole provided near the distal end of hinge pin 11 which extends beyond the forward hinge sleeve section. The right gripper blade is similarly installed and held in position on the right floor section.

Referring now to FIG. 6, when installed, each gripper blade will extend inwardly toward the center of the V-shaped opening (generally ¼ to 2 inches) beyond the turned up lip 18 in each respective floor section. The extent to which gripper blades 14 and 15 extend beyond the turned up lips 18 determines the maximum depth of "bite" the gripper blade can make into any post being pulled.

Referring now to FIG. 3 housing side panels 1 and 2 are formed in such a manner that, when viewed from the top, the rear edges of said panels containing the double bend are effectively parallel to the V-shaped opening in the floor section and substantially vertical above it. This design feature causes the upper portions of the rear edges of side panels 1 and 2 to act as a safety stop, discouraging the top of a post which is being pulled from pivoting forward and striking the operator of the tractor once the post is free of the ground. Additionally, the upper portion of the rear sections of side panels 1 and 2 act as a guide to encourage a post which has been pulled to lay down directly away from the tractor when released, allowing the operator to back to the next post without driving over or around the post already pulled and released.

Figure 4F:
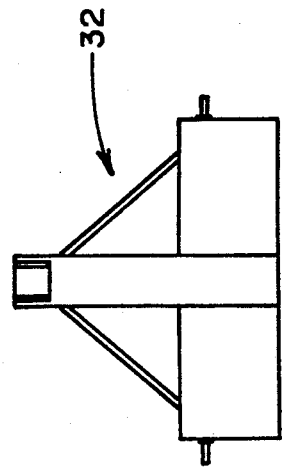
FIG. 4(a), 4(c) and 4(d) show a fully assembled view of an alternate configuration of the invention.
FIG. 4(b), 4(e) and 4(g) show a fully assembled view of another alternate configuration of the invention.
Figure 4E:
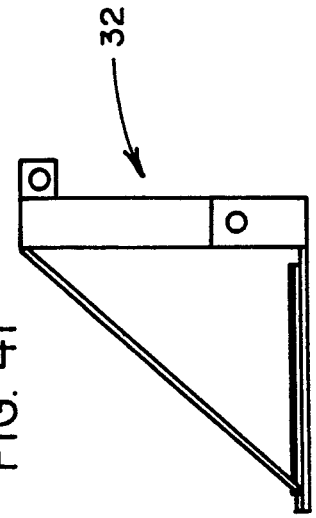
Figure 4B:
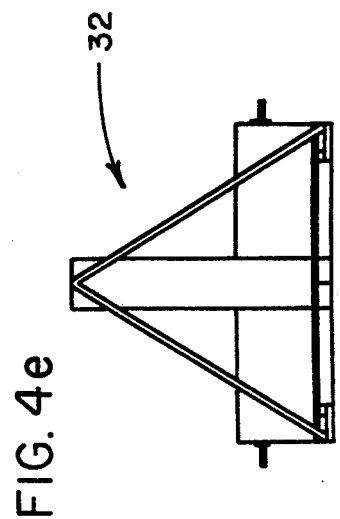
Figure 4C:
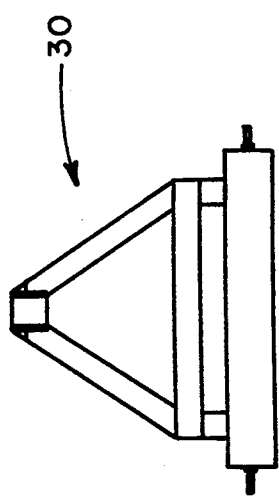
Figure 4D:
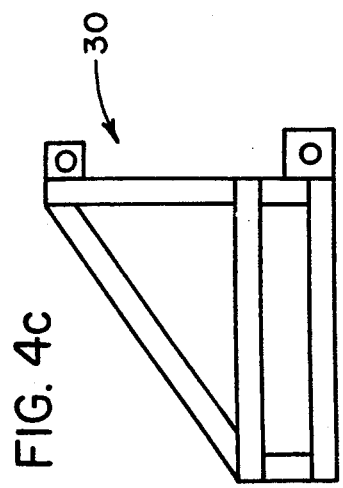
Figure 4A:
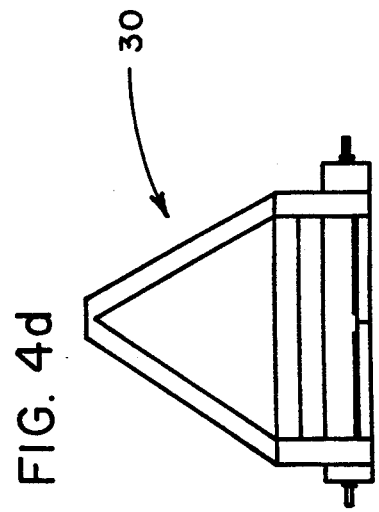
Figure 7:
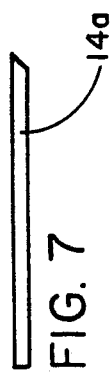
FIG. 7 is a sectional view taken generally in the direction of 7—7 of FIG. 5(a).
Figure 8:
FIG. 8 is a sectional view taken generally in the direction of line 8—8 of FIG. 5(a).
Figure 9:
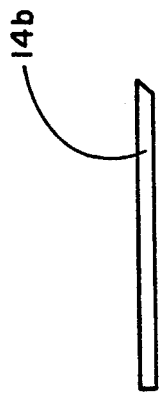
FIG. 9 is a sectional view taken generally in the direction of line 9—9 of FIG. 5(b).
Figure 10:
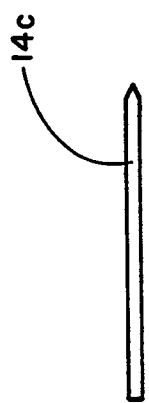
FIG. 10 is a sectional view taken generally in the direction of line 10—10 of FIG. 5(c).

Although the drawings and descriptions depict a housing fabricated from sheared and formed plate steel being enclosed on three sides, a skeletal frame housing as shown in FIGS. 4(a) and 4(b) fabricated from structural steel members presenting open sides, but with the same basic configuration, also falls within the scope and concept of this invention.

OPERATION OF THE INVENTION

FIG. 1 shows the invention attached to the three point hitch mechanism of a farm tractor. To attach the post puller to the three point hitch, first insert axles 8 through the holes provided in the ends of the draft links 19 and secure them in position by inserting hitch pin 21 (or other suitable retainer) through the holes provided in the ends of axles 8. Pivot the device about axles 8 until the gripper blades 14 and 15 are effectively parallel with the ground. Adjust the length of center link 20 until the hole provided in its free end is in alignment with the holes in bracket 10. Secure center link 20 in position by inserting hitch pin 21 (or other suitable means) through holes provided in bracket 10 and center link 20. Some farm tractors are equipped with stabilizer braces (not shown) which, when connected, preclude latitudinal or side to side movement of the three point hitch mechanism. Other tractors are equipped with chains (not shown) which are adjustable so as to control the limits to which the three point hitch mechanism can move from side to side. In order to enjoy maximum advantages of this invention, the stabilizer braces should be disconnected (not secured around axles 8) and/or limiting chains should be adjusted so as to allow maximum side to side movement of the three point hitch mechanism. This procedure is well known by those persons familiar with three point hitch operation. None of the three point hitch parts are included in this invention and are discussed here only to explain methods for attaching this invention to a farm tractor.

Once attached to the three point hitch mechanism as described above, this invention is ready for pulling posts. To pull a post, the operator lowers the post puller, by use of the three point hitch control lever on the tractor, to a position near the ground. He then drives backwards until the post puller is in contact with the post to be pulled. Precise maneuvering of the tractor to achieve perfect alignment with the center of the post is not required. Maneuvering accuracy is required only to the extent that the post must strike the post puller somewhere within the wide opening of the V-shape formed by gripper blades 14 and 15. This degree of accuracy in maneuvering is easily attainable to most tractor operators. Therefore, it is not necessary for the operator to repeatedly move forward and backward to attain perfect alignment with the post as required by most other post pullers. When the sharpened edge of either gripper blade 14 and 15 strikes the post, that edge will guide the invention into an automatically centered position. As the operator continues to move backward, the gripper blade in contact with the post will exert force against it, causing the invention and the three point hitch mechanism to move laterally or sideways away from that gripper blade until the opposing gripper blade is in contact with the post. At this point, the sharpened edges of both gripper blades 14 and 15 are in contact with the post, the post is centered in the post puller and an initial "bite" has been established. The operator may immediately lift the post puller using the tractor's three point hitch control lever. The upward movement of the invention while both gripper blades are in firm contact with the post causes the sharpened edges of said gripper blades to rotate downward pivotally around hinge pin 11. Downward movement of the sharpened edges of said gripper blades causes the edges to come closer together, thereby increasing their grip on the post. As lifting continues, the post will begin to move upwards and out of the ground. Once the post is clear of the ground, the operator may move backward while lowering the three point hitch mechanism. When the post strikes the ground, the sharpened edges of gripper blades 14 and 15 will rotate upwards around hinge pin 11, move farther apart and release their grip on the post. The upper portion of the rear edges of side panels 1 and 2 which have prevented the top of the post from moving forward toward the operator during the pulling process, now act as a guide to encourage the post to fall directly away from the tractor as the post is released. If the tractor is moving backward as the post is released, the post will almost always fall directly away from the tractor so that the operator can continue backing to the next post without driving over or around the post just pulled and released. Referring to FIG. 5(a), the wide opening of the V-shape formed by the gripper blades 14 and 15 and use of utility gripper blades allows the operator to alternately pull a large range of sizes of wood posts and standard metal T posts without having to dismount form the tractor or make any adjustments whenever to the invention.

What is claimed is:

1. A device for extracting fence posts and other similar elongated pieces from the earth comprising:
    a. a housing with a front side, a base side, a right side, a left side, and a rear side;
    b. means for coupling housing to a lifting mechanism;
    c. means for coupling the housing with the lifting mechanism whereby the housing will remain substantially vertical, with reference to the horizon, during the vertical motion of the housing;
    d. within the housing, a means for gripping a post to be extracted;
    e. the means for gripping the post which is comprised of two substantially horizontal, with reference to the horizon, gripper blades, each composed of a gripping edge and an unsharpened edge which is opposite to the gripping edge, pivotally attached to the base side of the housing; and
    f. a means for horizontally, with reference to the horizon, pivotally mounting the gripper blades in a V-shaped manner whereby the gripper blades are aligned such that the gripping edges of the blades are higher, with reference to the horizon, than the unsharpened edges of the gripper blades when the device is static and whereby the gripping edges are able to rotate or attempt to rotate downward when a post is placed against the gripping edges of the gripper blades and the device is raised.

2. A device as recited in claim 1 wherein the means for coupling the housing to the lifting mechanism is a three point hitch mechanism.

3. A device as recited in claim 1 wherein the rear side of the housing being comprised of a substantially vertical, with reference to the horizon, V-shaped opening which prevents the post from rotating and striking a person operating the device.

4. A device as recited in claim 3 wherein the gripper blades are switchable and reversible.

5. A device as recited in claim 4 wherein pairs of the gripper blades have the following characteristics:
- g. a combination wavy bevel cut and straight double bevel cut gripping edge;
- h. a gripper teeth bevel cut gripping edge; or
- i. a straight double bevel cut gripping edge.

6. A device for extracting fence posts and other similar elongated pieces from the earth comprising:
- a. an open-sided pyramidical structure with a front face, a base face, a left face, a right face, and a rear face;
- b. means for coupling the open-sided pyramidical structure to a lifting mechanism;
- c. means for coupling the open-sided pyramidical structure with the lifting mechanism whereby the open-sided pyramidical structure will remain substantially vertical, with reference to the horizon, during the vertical motion of the open-sided pyramidical structure;
- d. within the open-sided pyramidical structure, a means for gripping a post to be extracted;
- e. the means for gripping the post comprised of two substantially horizontal, with reference to the horizon, gripper blades, each composed of a gripping edge and an unsharpened edge which is opposite to the gripping edge, pivotally attached to the base face of the open-sided pyramidical structure; and
- f. a means for horizontally, with reference to the horizon, pivotally mounting the gripper blades in a V-shaped manner whereby the gripper blades are aligned such that the gripping edges of the blades are higher, with reference to the horizon, than the unsharpened edges of the gripper blades when the device is static and whereby the gripping edges are able to rotate or attempt to rotate downward when a post is placed against the gripping edges of the gripper blades and the device is raised.

7. A device as recited in claim 6 wherein the means for coupling the open-sided pyramidical structure to the lifting mechanism is a three point hitch mechanism.

8. A device as recited in claim 6 wherein the rear face of the open-side pyramidical structure is composed of a substantially vertical, with reference to the horizon, V-shaped opening which prevents the post from rotating and striking a person operating the device.

9. A device as recited in claim 8 wherein the gripper blades are switchable and reversible.

10. A device as recited in claim 9 wherein pairs of the gripper blades have the following characteristics:
- h. a combination wavy bevel cut and straight double bevel cut gripping edge;
- i. a gripper teeth bevel cut gripping edge; or
- j. a straight double bevel cut gripping edge.

* * * * *